April 30, 1935.  J. SCHAEFFERS  1,999,849
INTERNAL COMBUSTION ENGINE
Filed May 15, 1933
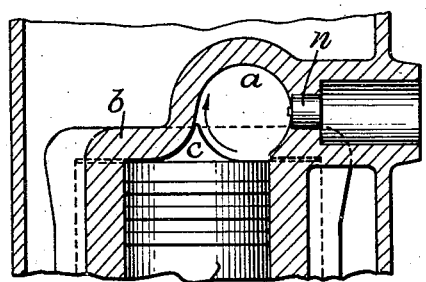
Fig. 1.
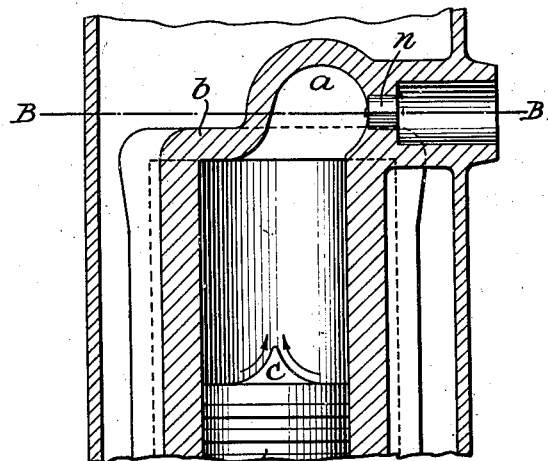
Fig. 2.
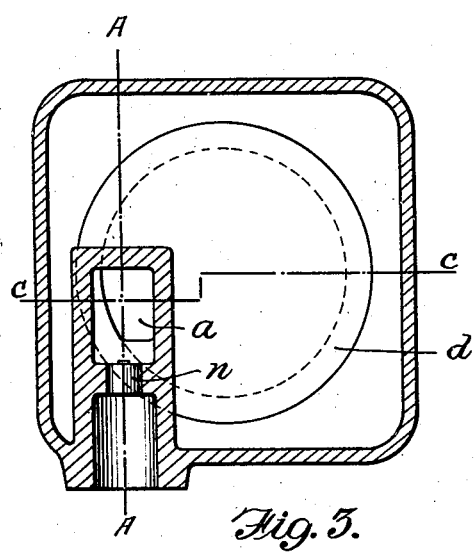
Fig. 3.
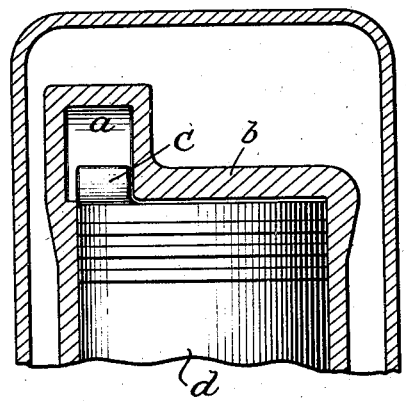
Fig. 4.
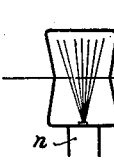
Fig. 5.
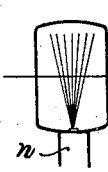
Fig. 6.
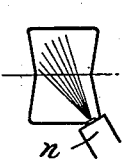
Fig. 7.
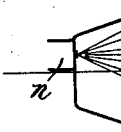
Fig. 8.
Fig. 9.
Inventor
Joseph Schaeffers Patented Apr. 30, 1935

1,999,849

UNITED STATES PATENT OFFICE 1,999,849

INTERNAL COMBUSTION ENGINE

Joseph Schaeffers, Cleveland, Ohio

Application May 15, 1933, Serial No. 671,249

8 Claims. (Cl. 123—32)

This invention relates to an internal combustion engine and for purposes of illustration it is shown as adapted to an engine of the Diesel type.

For high speed Diesel engines it is desirable to reduce the percentage of excess air required and, at the same time eliminate afterburning. In view of the extremely short period of time available for mixing the fuel with the air, often less than the one-thousandth part of a second, it is absolutely necessary to have a combustion chamber which simultaneously is a rapid mixing chamber. The best results are obtained where the fuel is injected into a rapid moving air stream at an angle, which need not necessarily be a right angle.

A mixing chamber which accomplishes that result is the subject of this present invention.

The drawing illustrates in

Fig. 1 a fragmentary vertical section along line A—A of Fig. 3, with the piston at outer dead center;

Fig. 2 is a view similar to Fig. 1, but with the piston at inner dead center;

Fig. 3 is a section on the line B—B of Fig. 2;

Fig. 4 a vertical section along line C—C of Fig. 3; and

Figs. 5, 6, 7, 8 and 9 are diagrammatic views showing modifications of the chamber outlines and various locations of the fuel nozzle.

The combustion chamber or space $a$ is formed for the greater part by a pocket in the cylinder head $b$ and for a small portion by a lip $c$ on the piston. The pocket in the cylinder head communicates with the cylinder, but the communicating space corresponds in shape and volume to the lip on the piston in such a way that at outer dead center position the chamber forms a space separate and aside from the cylinder and of almost completely circular form. Moreover, when the piston rises and displaces the air charge, forcing it into the chamber, the air is deflected by the sides of the lip into an upward direction as indicated by two arrows in Fig. 2 and as the piston approaches outer dead center position the air rushing from the cylinder into the chamber $a$ is forced into rapid rotation as indicated by the arrow in Figure 1.

The combustion chamber or space $a$ is for about three-quarters of its circumference formed by the cylinder head $b$ and only for about one-quarter by the lip $c$ on piston $d$, and a small portion of the top of the piston.

A nozzle $n$ is so located that the fuel jet meets the air stream at substantially a right angle as shown in Fig. 1.

The outline of the chamber need not necessarily be cylindrical with flat sides, but as shown in Fig. 5, the sides can be made to bulge inwardly as shown, or outwardly, if desired. Or the chamber could be of barrel shape as shown in Fig. 6. Moreover, the nozzle can be set at an odd angle so as to give the jet of fuel a diagonal direction. Or the nozzle can be located laterally, so that the jet parallels the center line of the chamber as shown in Fig. 8. In that case a taper or cone shape is shown as the most advisable for the chamber, and with the jet at an angle as in Fig. 9.

Any number of other variations and modifications are possible, of course. The width of the lip on the piston, the width and diameter of the chamber and the location can be varied and proportioned to suit. The lip is shown adjoining the periphery of the piston as the preferred location only.

Having thus described my invention, what I claim as new and desire to secure by Letters Patent are:

1. In an internal combustion engine, a chamber separate and aside from the cylinder proper and having a cylindrical wall extending approximately three-quarters of the circumference of a circle, the remaining part of said wall being curved reversely to said cylindrical wall, and a lip on the piston formed substantially by two fillets having substantially the same radii as that of said cylindrical wall and reversely curved part, respectively, whereby, when the piston is in the outer dead center position, the lip projects into said chamber and co-operates with the cylindrical wall to form a substantially cylindrical chamber.

2. In an internal combustion engine, the combination of a piston and a cylinder having a head formed with a cylindrical pocket the cylindrical portion of which is open to permit communication with the cylinder, one terminating side of the open portion, one terminating side of said wall being substantially tangential to the piston head when the piston is in the outer dead center position and the other terminating side of the open portion being cut away, and a lip on the head of said piston arranged to project therefrom into said cutaway, the inner wall of said lip being curved on the radius of said cylindrical pocket and co-operating therewith when the piston is in the outer dead center position to form a substantially cylindrical combustion space.

3. In an internal combustion engine, the combination of a piston and a cylinder having a head formed with a cylindrical pocket the cylindrical portion of which is open to permit communication with the cylinder, one terminating side of the open portion, one terminating side of said wall being substantially tangential with the piston head when the piston is in the outer dead center position and the other terminating side of the open portion being cut away, and a lip on the head of said piston, one wall of said lip being complementary to said cutaway and arranged to project thereinto and the opposite wall of said lip being curved on the radius of said cylindrical pocket and co-operating therewith when the piston is in the outer dead center position to form a substantially cylindrical combustion space.

4. In an internal combustion engine, the combination of a piston and a cylinder having a head formed with a pocket having a cylindrical side wall a portion of which is open to permit communication with the cylinder, one end of said cylindrical side wall adjacent the inner wall of said head being cut away, and a lip on the head of said piston arranged to project into said cutaway when the piston is in the outer dead center position, the inner wall of said lip being curved on the radius of said cylindrical side wall and co-operating therewith to form a substantially cylindrical combustion space when the piston is in the outer dead center position.

5. In an internal combustion engine, the combination of a piston provided on its head with a lip and a cylinder having a head formed with a cylindrical pocket having a portion arranged to receive said lip when the piston is in the inner dead center position and a cylindrical portion, said lip and piston head serving to close said pocket when the piston is in the outer dead center position to form a combustion space and the inner wall of said lip being curved on the same radius as said cylindrical portion and serving to induce a rotary circulation of the atmosphere compressed into said space by the outward stroke of the said piston.

6. In an internal combustion engine, the combination of a piston provided on its head with a lip, a cylinder having a head formed with a cylindrical pocket having a portion arranged to receive said lip when the piston is in the outer dead center position and a cone shaped portion, said lip and piston head serving to close said pocket when the piston is in the outer dead center position and the inner wall of said lip being curved on the same radius as said cone shaped portion and serving to induce a rotary circulation of the atmosphere compressed into said pocket by the outward stroke of the said piston, and means for supplying fuel into said space in a direction substantially parallel to the axis of said cone-shaped portion.

7. In an internal combustion engine, the combination of a piston provided on its head with a lip and a cylinder having a head formed with a pocket communicating with the cylinder and having a cylindrical wall extending about an axis substantially 270 degrees and end walls and a wall curved about a different axis, said lip having walls curved on radii substantially equal to that of said circumferential wall and said curved wall, respectively, and co-operating with the piston wall to close said pocket and form a combustion space of substantially cylindrical shape.

8. In an internal combustion engine, the combination of a cylinder and a reciprocating piston therein, the end wall of said cylinder being shaped to form a pocket communicating with the cylinder and having a side wall a section of which is of cylindrical shape forming the greater portion of a cylindrical space, and another section of which is curved in the opposite direction to form a cutaway, and a lip on said piston arranged to project into said cutaway when the piston is in the outer dead center position, the inner wall of said lip co-operating with the piston head and said cylindrical shaped circumferential wall section to form a combustion space of substantially cylindrical shape.

JOSEPH SCHAEFFERS.